Nov. 21, 1933. T. G. W. SETTLE 1,935,672
BALLASTING APPARATUS
Filed Sept. 16, 1932 4 Sheets-Sheet 1

THOMAS G. W. SETTLE
INVENTOR

BY Robert a Lavender
ATTORNEY

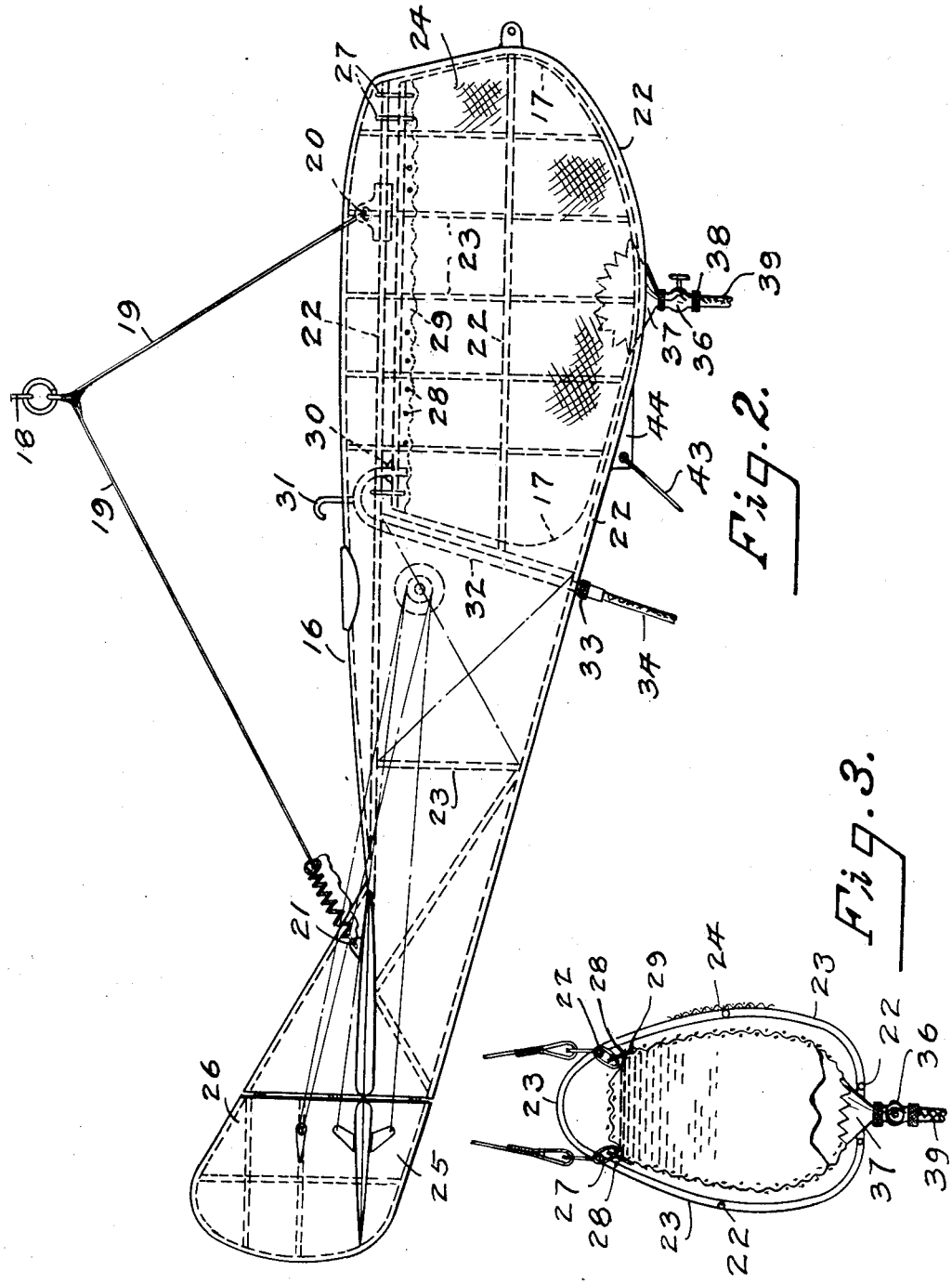

Nov. 21, 1933.  T. G. W. SETTLE  1,935,672
BALLASTING APPARATUS
Filed Sept. 16, 1932  4 Sheets-Sheet 4
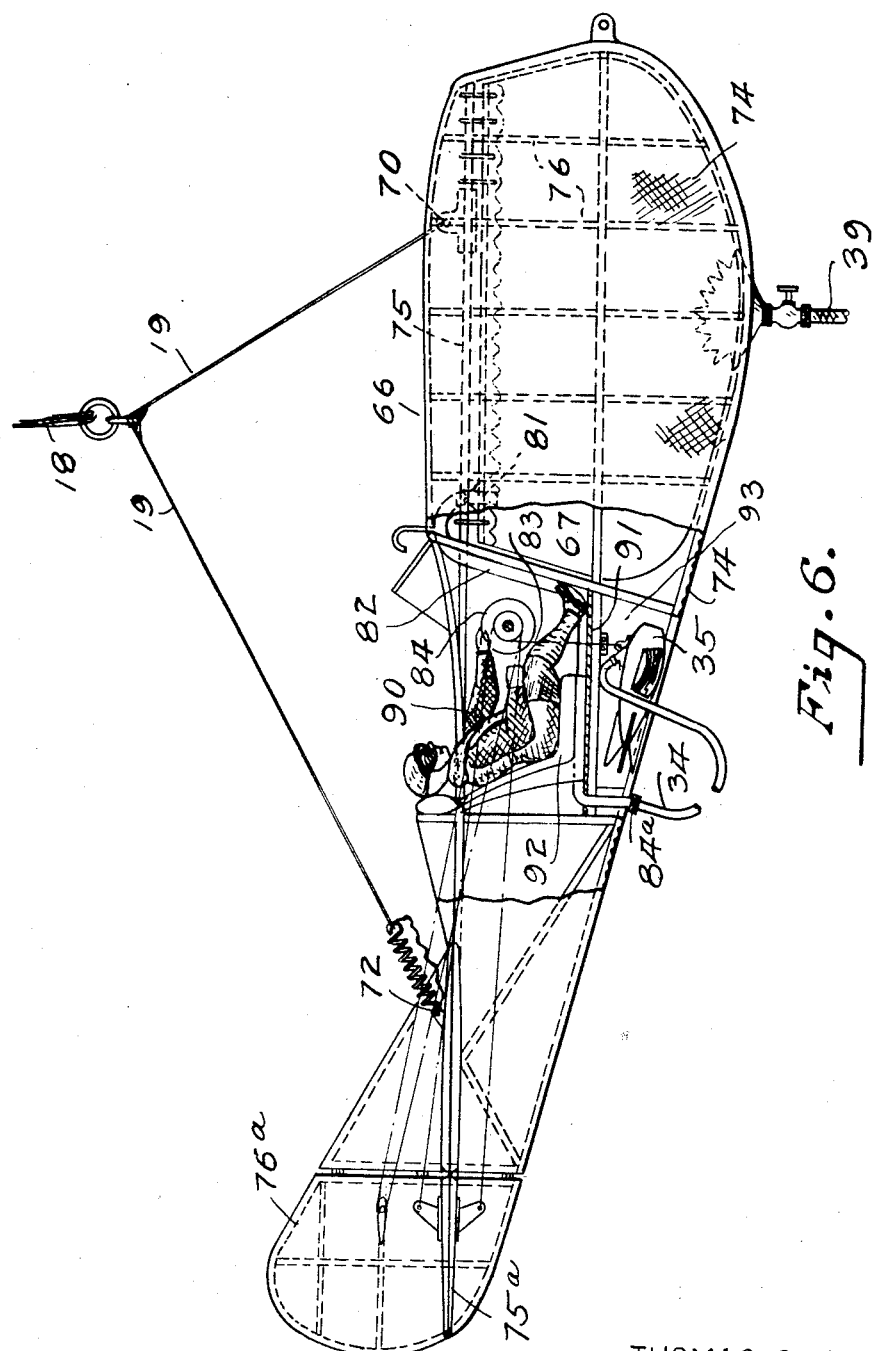
THOMAS G. W. SETTLE
INVENTOR
BY
*Robert a Lavender*
ATTORNEY Patented Nov. 21, 1933

1,935,672

UNITED STATES PATENT OFFICE 1,935,672

BALLASTING APPARATUS

Thomas G. W. Settle, United States Navy

Application September 16, 1932
Serial No. 633,492

15 Claims. (Cl. 244—30)

(Granted under the act of March 3, 1883, as
amended April 30, 1928; 370 O. G. 757)

My invention relates broadly to ballasting apparatus, and more particularly to a device for picking up water.

The principal object of my invention is to provide a device for picking up ballast water while the aircraft is under way over a body of water.

Another object is to provide a device for the ballasting of airships while moored or riding at a floating mast.

A further object of my invention is to provide means for restoring and/or maintaining the static equilibrium in counter action to tendencies to change such equilibrium caused by the consumption of liquid fuel in the engines, superheating effects, correction for change in trim caused by the landing and launching of airplanes from the airship, and other like causes, thereby obviating the necessity of valving of the lifting gas.

A still further purpose of my invention is to provide an improved water ballast apparatus so as to dispense with such commonly known cumbersome water recovery apparatus which depends upon utilizing the engine exhaust for collection of water by the condensation of moisture in the exhaust gases.

Another object is to provide a device that may be used for observation purposes by including a cockpit for a person to be located in a basket who may assist in the manipulation of ballasting maneuvers as well as give directions for the course of the airship and observe objects on the surface, while suspended below the airship.

It is also an object of my invention to provide a device that is rugged, light in weight, and one that can be easily installed and manipulated in connection with the airship.

With the above and other objects in view, the invention consists in the construction, combination and arrangement of parts as will be described more fully hereinafter.

Heretofore, attempts have been made to force sea water up to an aircraft by trailing pump equipped drogues and the like along the surface of the water, but the hazards encountered have caused the apparatus to be made too heavy and cumbersome to handle, and since safe altitude limit for an aircraft to travel over the water may vary from two hundred feet in smooth air to four hundred feet in rough air, the head of the water in being forced up to the aircraft by hose connection direct would encounter great difficulty; in that under such conditions if a pump was used, the load of water being lifted up too great a height would require too much power to operate a pump. While under other conditions, if the lifting of the water was dependent upon the scooping effect to force the water up past a check valve, then the weight of the head of water in the hose would offset the driving force created by forward motion of the scoop and would not lift the water to a sufficient height to accomplish the purpose.

My improved ballasting apparatus provides a means for the lowering of a container from the aircraft, that is within safe altitude operating limits over a body of water, to approximately sixty feet from the water, and to tow a small submerged paravane therefrom by a flexible cable connected to the frame of the container, and to force water through a check valve and a hose leading from the paravane and into the container. When the container is filled, it is hoisted by a winch mechanism to a position within the aircraft, and the water is transferred by hose connections to a storage container and distributed by ducts throughout the ballasting system.

Reference is to be had to the accompanying drawings forming part of the specification, in which like reference characters indicate corresponding parts throughout the several views, and in which:

Fig. 2 is an enlarged view of my fusiform body and water container;

Fig. 3 is the front view of the fusiform body;

Fig. 6 is an enlarged view partly broken away to disclose portions of the interior of a modification of the water transfer container, and the cockpit for the person directing the maneuvers.

Figure 1:
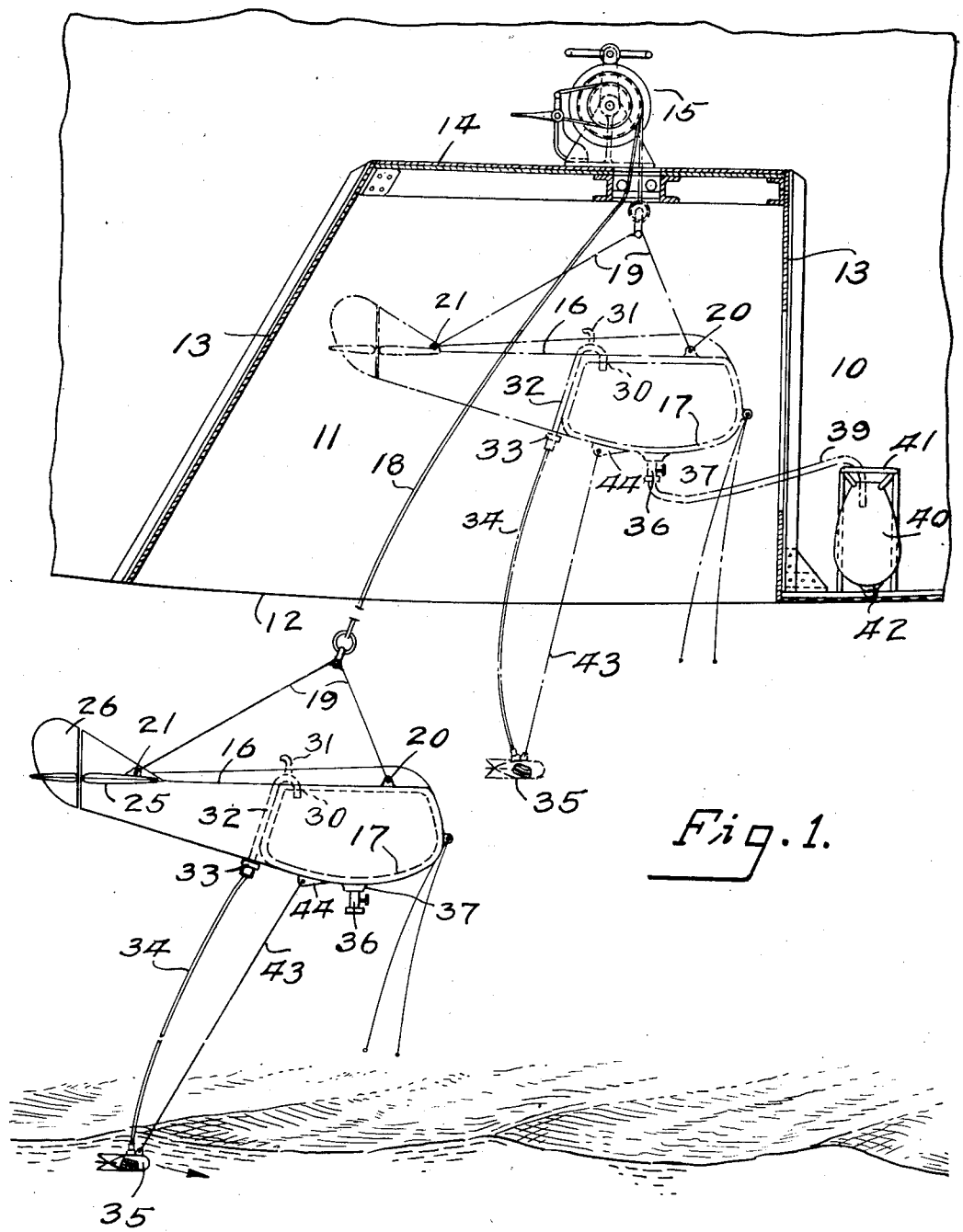
Fig. 1 is a schematic view of a portion of an aircraft having my improved ballasting apparatus associated therewith.
Figure 4:
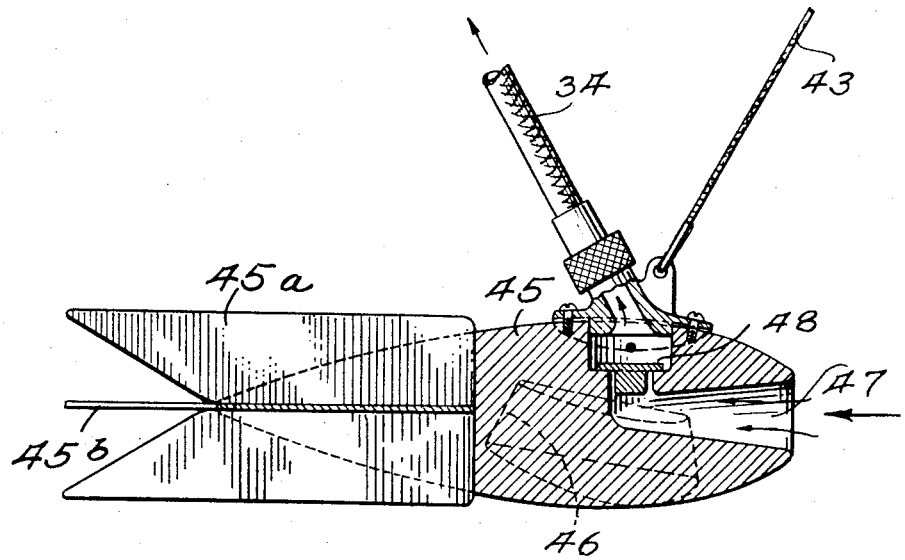
Fig. 4 is an enlarged central vertical section through my paravane towing attachment.
Figure 5:
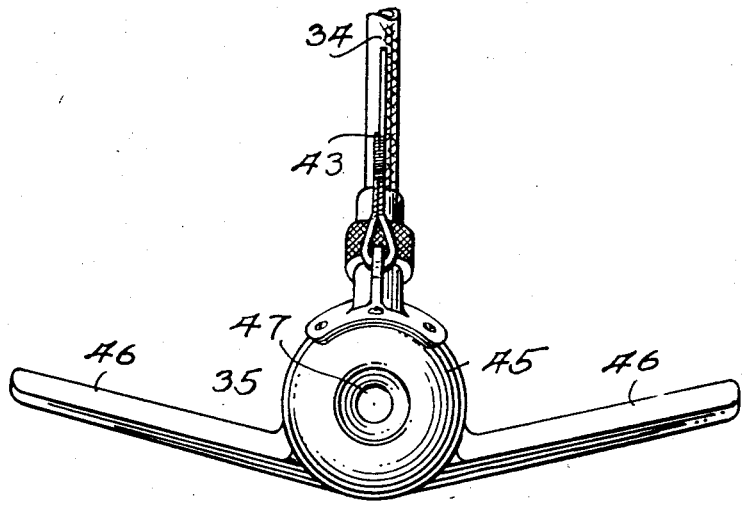
Fig. 5 is a front view of the paravane towing attachment.

Referring more particularly to the drawings, 10 indicates a portion of an aircraft disclosed more or less diagrammatically, showing compartment 11 having a hatch-way 12 separated from the interior by an enclosed frame structure 13 of light-weight fabricated channels and sheet metal designed sufficiently strong to support a suitable platform 14 for mounting a hoisting winch 15 from which a streamlined frame 16 for lowering a water container 17 is suspended by a flexible cable 18. The winch 15 may be either manually or mechanically operated and is provided with a winding drum for the cable 18.

The frame 16 is suspended from the aircraft 10 by a cable 18 secured to a hoisting sling 19 and to fittings 20 and 21. The frame 16 for the container 17 is composed of longitudinal members 22 and transverse frame members 23 which are enclosed by a light-weight outer covering 24 to cut down the air resistance. Horizontal and vertical stabilizing surfaces 25 and 26, respectively, are provided at the rear end of the frame to prevent twisting and to keep the container head-on while in operation. The container 17 is preferably made of water-proof canvas or of rubberized fabric to insure lightness of weight and is suspended by a series of links 27 which pass through eyelets 28 located along flaps 29 near the upper part of container 17 and to certain of the frame members 22. A water inlet opening 30 is located at the top of container 17 and is connected by piping 32 and a detachable coupling 33 to the water supply hose 34 from the paravane 35, an air vent 31 being provided to prevent the containers from becoming air bound during the filling operation. A valve 36 is located in a sump fitting 37 at the bottom of container 17. The valve 36 is provided with detachable connection 38 to which a length of hose 39 is attached by an attendant after the container 17 and its frame 16 have been hoisted within hatch-way 12. The water is then transferred by the hose 39 to a stowage container 40 and the operation repeated until a sufficient supply of ballast water has been obtained.

The stowage container 40 in this instance is represented by a fabric bag similar to the one designated as 17, which container remains in permanent rack 41 and the contents distributed by container 42 through the aircraft to points where replenishment of water ballast is needed.

The paravane attachment 35 is suspended by a cable 43 from a fitting 44 located on the underside of the container frame 16 and is provided with a streamlined body portion 45 having inverted aerofoil sections 46 projecting from either side thereof, and set at an angle so that upon contact with the surface of the water, these sections will cause the paravane to submerge. A tapered passage 47 having its inlet opening at the forward end is provided to force the water entering the same to unseat a valve cover 48 that, upon withdrawal from the water of the paravane, operates automatically to check the return flow of water that has once passed the valve cover. The rear portion of the paravane body 45 is provided with both vertical and horizontal fins 45a and 45b, respectively, to prevent twisting and to hold the paravane head-on into the elements.

Reference to Fig. 6 of the drawings will disclose a modification of my streamline frame for the water container in which a cockpit has been incorporated whereby a person may be lowered with the container to assist in the manipulation of the ballasting maneuver as well as to act in the capacity of an observer to direct the movements of the aircraft while suspended below the same.

In the modification, the container frame 66 is suspended from the airship by the cable 18 secured to the hoisting sling 19, and to fittings 70 and 72. The container frame 66 is composed of longitudinal members 75 and transverse frame members 76 which are enclosed by a light-weight covering 74 to cut down air resistance. Horizontal and vertical stabilizing surfaces 75a and 76a, respectively, are provided at the rear end of the frame to prevent twisting and keep the container and frame properly directed while in operation. Container 67 is also made of waterproof fabric and is connected to the uppermost frame members 75 by a series of links which pass through eyelets located along the flaps near the upper part of the container, as in my preferred form. A water inlet opening 81 is located at the top of container 67 which is provided with a piping 82 extending to a point beneath frame 66, where the water supply hose 34 from paravane 35 is connected by a detachable coupling 84a.

Cockpit 90, that has been provided in frame 66 to the rear of container 67, has a flooring 91 and a seat 92. A compartment 93 is located beneath the flooring 91 for stowing the paravane 35 when it is desired to use the apparatus for observation purposes. Provision is made for hauling in cable 83, by a reel 84 located in the frame 66 within convenient reach of the observer seated in the cockpit 90.

The control surfaces 75a and 76a are manually adjustable by means of cable and reel connections in the cockpit.

In the operation of the apparatus the container frames 16 or 66 with their containers are first lowered from the compartment 11, to the desired suspended position with the paravane 35 likewise in a suspended position, and the aircraft is nosed down until the paravane has entered the surface of the water. Here the airship is leveled off and held as nearly as possible at the desired altitude and the paravane, in being towed through the water, will force water into duct 47, through check valve 48 and hose 34 into container 17.

When container 17 supported in frames 16 or 66 has been filled, the apparatus is hauled into the compartment 11, the contents transferred to the stowage container in the airship and the operation completed until sufficient ballast water has been obtained.

It will be understood that the above description and accompanying drawings comprehend only the general and preferred embodiment of my invention, and that various changes in construction, proportion and arrangement of parts may be made within the scope of the appended claims, without sacrificing any of the advantages of this invention.

The herein described invention may be manufactured and used by or for the Government of the United States for governmental purposes without the payment of any royalty thereon.

What I claim is:

1. In a water ballasting apparatus for aircraft, in combination, a compartment within the aircraft, hatch-ways within said compartment, a container suspended from within said compartment, means for lowering and raising said container through one of said hatch-ways, means comprising a flexible hose suspended from said container for directing water flow to said container, means comprising a paravane attached to said hose and suspended from said container, and means within said paravane for checking back flow of water therefrom.

2. In a water ballasting apparatus for aircraft, in combination, a compartment associated with the aircraft, a hatch in the bottom of said compartment, a container suspended from within said compartment, means for raising and lowering said container through said hatch, a second container within the aircraft, means for transferring the contents of said first container to said second container, and means comprising a flexible hose suspended from said first container for filling the said first container and means connected to said hose for forcing water from a body of water through said hose.

3. In a water ballasting apparatus for aircraft, in combination, a compartment supported by the aircraft, an access hatch in the bottom of said compartment, a container suspended from within said compartment, a winch associated with said compartment for raising and lowering said container through said access hatch, a second container supported within the aircraft, means for transferring the contents of said first container to said second container after said first container has been raised into said compartment, a paravane suspended from said first container, a flexible hose connecting said first container and said paravane, and means within said paravane for forcing a flow of water through said flexible hose to said first container when said paravane is in a body of water.

4. In a water ballasting apparatus for aircraft, in combination, a compartment supported by the aircraft, a hatch-way in said compartment, a container suspended below the aircraft, hoisting means for stowing said container within said compartment, a flexible hose suspended from said container, and means attached to said flexible hose for forcing a flow of water to fill said container while being towed submerged in the crest of the waves of the sea.

5. In a water ballasting apparatus for aircraft, in combination, a compartment in the aircraft, a hatch-way in said compartment, a container suspended from within the compartment, a winch for raising said container through said hatch-way to within said compartment or for lowering the same in suspended position below the aircraft, a paravane suspended from beneath said container for contact with a surface of a body of water, a hose connected between said paravane and said container, and means within said paravane for forcing water through said hose to fill said container while the aircraft is under way.

6. In a water ballasting apparatus for aircraft, in combination, a container suspended from the aircraft, means between said aircraft and said container for hoisting the same to the aircraft, a paravane, a flexible hose connecting said container and said paravane, said paravane being suspended from beneath said container, and means associated with said paravane to force water through said hose to said container while the aircraft is under way.

7. In a water ballasting apparatus for aircraft, in combination, a container suspended from an aircraft, hoisting means for said container, a paravane suspended from the container adapted to force water up to said container during forward movement of the aircraft, a water deflecting passage-way at the front of said paravane, a check valve within said passage-way to prevent return flow of the water, a hose connection above said valve, a flexible hose between said connection and said container.

8. In a water ballasting apparatus for aircraft, in combination, a container suspended from the aircraft, means for hoisting the container to the aircraft, a paravane suspended from the container, means for hoisting said paravane to said container, and means between said container and said paravane for forcing water to fill said container when said paravane is towed along the crest of the waves of a body of water.

9. In a water ballasting apparatus for aircraft, in combination, a streamlined frame suspended from beneath the aircraft, means for hoisting said frame to within the aircraft, tail surfaces on said frame for keeping said frame properly directed, means for adjusting said tail surfaces from said frame, a water receiving container within said frame, water inlet piping connection within said frame for feeding said receiving container, an outlet valve in the bottom of said receiving container, a stowage container within the aircraft, a hose connection between said outlet valve and said stowage container adapted to be connected when said frame is hoisted to within said aircraft for transfer of water from said receiving container to said stowage container, a paravane suspended from said frame and adapted to be towed by the aircraft through the crest of the waves of a body of water, and means between said paravane and said receiving container for forcing water to said receiving container.

10. In a water ballasting apparatus, in combination, an aircraft, a streamlined frame suspended from beneath said aircraft, means for hoisting said frame to within said aircraft, a water stowage container within the aircraft, a water receiving container within said frame, means for transfer of the water from said receiving container to said stowage container, a streamlined weight having paravane blades extending from the sides thereof for forcing the same to submerge under the towing action of said aircraft while under way, hose connection between said weight and said receiving container for forcing water to said receiving container.

11. In a water ballasting apparatus, in combination, an aircraft, a frame suspended from beneath said aircraft, control surfaces for adjusting the trim of said frame located at the rear thereof, means for adjusting said surfaces from within said frame, a water receiving container within said frame, a cockpit within said frame for an observer to direct the ballasting maneuvers, a seat for the observer, a floor beneath said seat, a paravane suspended from said frame for submerging contact with the surface of the body of water, a compartment beneath said floor for the stowage of said paravane, hoisting means between said paravane and said frame for stowage of said paravane operated from said cockpit, means within said paravane for receiving and checking the return flow of water passing through said paravane, and hose connections between said paravane and said water receiving container for directing a flow of water to said container.

12. In a water ballasting apparatus, in combination, an aircraft, a compartment within the aircraft, a hatch in the bottom of said compartment, a frame suspended from beneath said aircraft, means for hoisting said frame to within said compartment and through said hatch, a water stowage container within said aircraft, a water container within said frame, means for transferring the contents of said water container to said stowage container when said frame is hoisted to within said compartment, control surfaces for adjusting the trim of said frame, means for adjusting said control surfaces from within said frame, a cockpit within said frame for an observer to direct the ballasting maneuvers, a seat for the observer, a floor beneath said seat, a paravane suspended from said frame for submerging contact with the surface of the body of water, a compartment beneath said floor for the stowage of said paravane, hoisting means between said paravane and said frame for stowage of said paravane operated from said cockpit, means carried by said paravane for checking the return flow of water forced therethrough, and hose connections between said paravane and said water receiving container in said frame for directing a flow of water to said container.

13. In a water ballasting apparatus for aircraft, a fusiform body having aerofoil surfaces, a water container within said body, a paravane, said paravane being suspended from beneath said body, a flexible hose connecting said container and said paravane, and means within said paravane for lifting water when said paravane is submerged in the crest of the waves of a body of water.

14. In a water ballasting apparatus, in combination, an aircraft, a fusiform body suspended from said aircraft and having adjustable control surfaces thereon, a container within said body, means for hoisting said body to said aircraft, a paravane flexibly suspended from said body having flexible hose connections to fill said container, a means within said paravane for raising water to said container when in contact with the surface of a body of water.

15. In a water ballasting apparatus, in combination, an aircraft, a fusiform body suspended from said aircraft and having control surfaces adjustable from within, means for hoisting said body to within said aircraft, a second container within said aircraft, means for transfer of the contents of said first container to said second container when hoisted to within said aircraft, a second fusiform body flexibly suspended from said first body, inverted aerofoils on said second body, a water deflecting passage within said second body having a check valve within, and flexible hose connection between said water passage and said first container.

THOMAS G. W. SETTLE.